United States Patent [19]

Zelenka

[11] Patent Number: 5,426,529
[45] Date of Patent: Jun. 20, 1995

[54] LIGHT BEAM DEFLECTION MEANS

[75] Inventor: Thomas Zelenka, Mönkeberg, Germany

[73] Assignee: Linotype-Hell AG, Eschborn, Germany

[21] Appl. No.: 66,053

[22] PCT Filed: Jul. 30, 1992

[86] PCT No.: PCT/DE92/00626
§ 371 Date: May 26, 1993
§ 102(e) Date: May 26, 1993

[87] PCT Pub. No.: WO93/06517
PCT Pub. Date: Apr. 1, 1993

[30] Foreign Application Priority Data

Sep. 26, 1991 [DE] Germany .................. 41 32 025.5

[51] Int. Cl.[6] ............................................ G02B 26/08
[52] U.S. Cl. .................................. 359/211; 359/220; 359/495
[58] Field of Search ............... 359/211, 209, 220, 222, 359/534, 537, 495, 499

[56] References Cited

U.S. PATENT DOCUMENTS

| 2,928,952 | 3/1960 | Bednarz | 359/211 |
| 3,614,448 | 10/1971 | DiProse | 359/211 |
| 4,475,787 | 10/1984 | Starkweather | 350/6.4 |
| 4,878,720 | 11/1989 | Hanke et al. | 350/6.4 |
| 4,936,643 | 6/1990 | Beiser | 350/6.5 |
| 5,011,245 | 4/1991 | Gibbs | 359/211 |
| 5,223,956 | 6/1993 | Kramer et al. | 359/220 |
| 5,357,375 | 10/1994 | Härig et al. | 359/211 |

FOREIGN PATENT DOCUMENTS

| 0179213 | 8/1985 | European Pat. Off. | G02B 26/10 |
| 3918075C1 | 10/1990 | Germany | G02B 26/10 |
| WO91/17466 | 11/1991 | WIPO | G02B 26/10 |

*Primary Examiner*—Scott J. Sugarman
*Assistant Examiner*—Thomas Robbins
*Attorney, Agent, or Firm*—Hill, Steadman & Simpson

[57] ABSTRACT

A deflection device is provided which serves the purpose of deflecting optical radiation and is designed of at least one prism. The prism is provided with at least one reflection surface and is rotationally seated with respect to a rotational axis. In order to enable high speeds, the deflection device is designed of at least two prisms that have an essentially symmetrical mass distribution with respect to the rotational axis.

22 Claims, 6 Drawing Sheets

LIGHT BEAM DEFLECTION MEANS

BACKGROUND OF THE INVENTION

The invention relates to the field of reproduction technology and is directed to an apparatus for the deflection of an optical beam, which is composed of at least one prism having at least one reflection face which is rotatably seated with respect to a rotational axis.

Light beam deflection devices are employed, for example, in scanner elements of originals scanner devices or in recording elements of recording devices.

In an originals scanner device, also referred to as an input scanner, a light beam generated in a scanner element is conducted over an original to be scanned point-by-point and line-by-line, and the scan light reflected by the original or transmitted through the original is converted into an image signal in an optoelectronic transducer. In a recording device, also referred to as a recorder, exposer or output scanner, the light beam acquired in a recording element is intensity-modulated by an image signal for recording information and is conducted point-by-point and line-by-line over a light-sensitive recording material.

In the case of a flat bed device, the holder for the original or for the recording material is a planar surface over which the light beam is guided point-by-point and line-by-line, and which moves relative to the scanner element or recording element.

In the case of an inside drum device, the holder for the original or for the recording material is designed a stationary half-shell or trough. The scanner element or recording element moves parallel to the longitudinal axis of the half-shell, and the light beam is radially guided over the original or the recording material in the half-shell perpendicularly relative to the longitudinal axis.

A light beam deflection means comprising a prism is disclosed by DE-C-39 18 075. An incident light beam here is first introduced into the prism via a light entry face and is inwardly reflected at an exit face. Another reflection occurs at a further limiting surface and the light beam is refracted when it exits the prism. The prism has an asymmetrical mass distribution with respect to the rotational axis. As a consequence of the centrifugal forces caused by the asymmetrical mass distribution, this light beam deflection means can only be operated in a limited speed range. Over and above this, considerable air turbulence occurs given higher speeds as a consequence of a shaping that is asymmetrical with reference to the rotational axis, this air turbulence resulting in the creation of noise.

Another light beam deflection means that is essentially composed of a prism is disclosed by U.S. Pat. No. 4,878,720. Here, too, the prism has an unbeneficial shaping as well as a mass distribution that leads to considerable, asymmetrical centrifugal forces as well as to a creation of noise.

SUMMARY OF THE INVENTION

It is therefore an object of the invention to improve a device for deflecting an optical beam such that it can be operated at high speeds.

The invention shall be set forth in greater detail below with reference to FIGS. 1 through 6.

DESCRIPTION OF THE PREFERRED EMBODIMENTS

Figure 1:
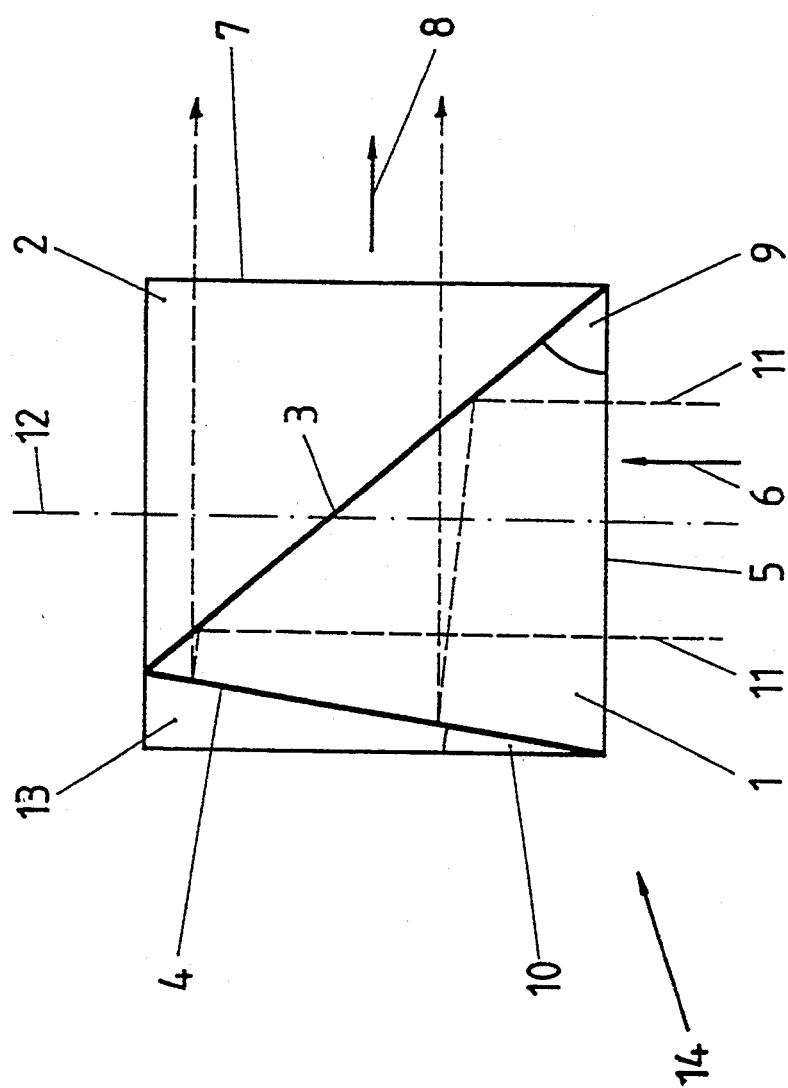
FIG. 1 is an exemplary embodiment of a light beam deflection means comprising three prisms.

FIG. 1 shows an exemplary embodiment of a light beam deflection means having three prisms. The light beam deflection means is essentially composed of an admission prism 1 and an exit prism 2. A reflection layer 3 having angularly dependent reflection properties is situated between those limiting surfaces of admission prism 1 and exit prism 2 that face toward one another. The admission prism 1 also comprises a mirror surface 4 and an entry face 5 that are aligned perpendicularly relative to a light entry direction 6 in the exemplary embodiment. The exit prism 2 has an exit face 7 that lies perpendicularly relative to a light exit direction 8. The reflection layer 3 describes an angle of approximately 45° through 60°, preferably of approximately 50°, with the entry face 5. The mirror surface 4 is inclined by an angle 10 relative to the light entry direction 6, this angle 10 essentially corresponding to the difference of the angle 9 from 45°. In this arrangement, an orientation of the light entry direction 6 of nearly 90° relative to the light exit direction 8 is achieved.

Given identical materials of the prisms 1, 2, the reflection face 3 is a multiple layer composed of a plurality of electrical layers. Alternatively, the reflection surface 3 can be designed as an air gap or as a layer having a lower refractive index. Dependent on the incident angle of a light beam 11 onto the reflection layer 3, the light beam 11 is either reflected or transmitted.

In the present exemplary embodiment, the incident angle of the light beam 11 incident through the entry face 5 of the admission prism 1 is selected with respect to the reflection surface 3 such that the light beam 11 is first reflected at the reflection surface 3 in the direction toward the mirror surface 4. The light beam 11 reflected by the mirror surface 4 is then incident on the reflection surface 3 with an incident angle such that the light beam 11 is allowed to pass by the reflection surface 3 and in turn emerges from the light beam deflection means through the exit face 7 of the exit prism 2. Slight transit paths of the light beam 11 through the light beam deflection means can be guaranteed in this way.

A mass distribution that is essentially symmetrical with reference to a rotational axis 12 is realized by a compensating prism 13 that is arranged in the region of the mirror surface 4 and, together with the admission prism 1 and the exit prism 2, forms an essentially cuboid-shaped light beam deflection means 14. In particular, it has been envisioned to design the admission prism 11, the exit prism 2, as well as the compensating prism 13 as triangular prisms that are glued to one another. In order to avoid distortions that could arise from a large-area gluing, a spot gluing is particularly envisioned.

The symmetrical mass distribution makes it possible to allow the light beam deflection means to rotate with a high speed without the dynamic stresses that thereby occur leading to destruction. In particular, vibrations and beats that result from resonant effects are also avoided. The designing of the light beam deflection means that has both a symmetrical mass distribution with respect to the rotational axis as well as a largely symmetrical design also makes it possible to reduce occurring air turbulence and to thereby both avoid the creation of noise as well as to reduce erratic running that results from air movement.

Figure 2:
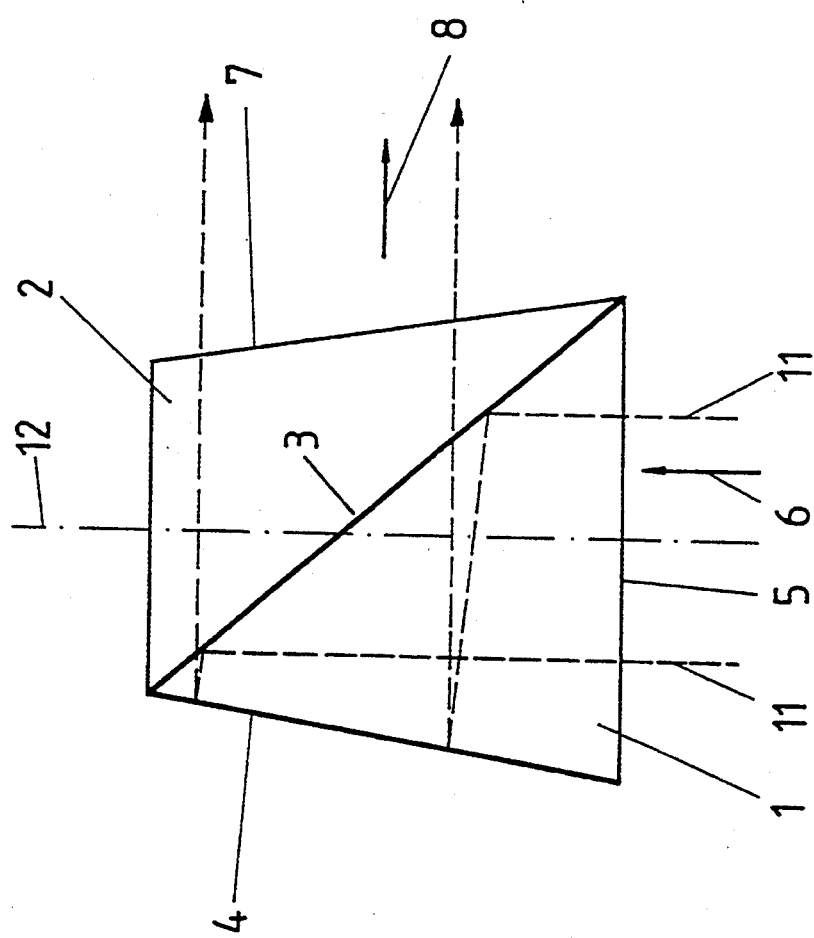
FIG. 2 is a further exemplary embodiment of a light beam deflection means comprising two prisms.

FIG. 2 shows an exemplary embodiment of a light beam deflection means comprising an admission prism 1 and an exit prism 2 wherein, by contrast to the means in FIG. 1, the compensating prism 13 is omitted. In order to create a mass distribution that is symmetrical with reference to the rotational axis 12, the exit prism 2 is shaped such that it supplements the admission prism 1 to form a symmetrical member. The exit face 7 thereby no longer lies perpendicularly relative to the light exit direction 8, but has a certain inclination. Over and above this, the number of parts to be joined to one another is reduced and the dynamics of the light beam means is improved due to a lower mass.

Figure 3:
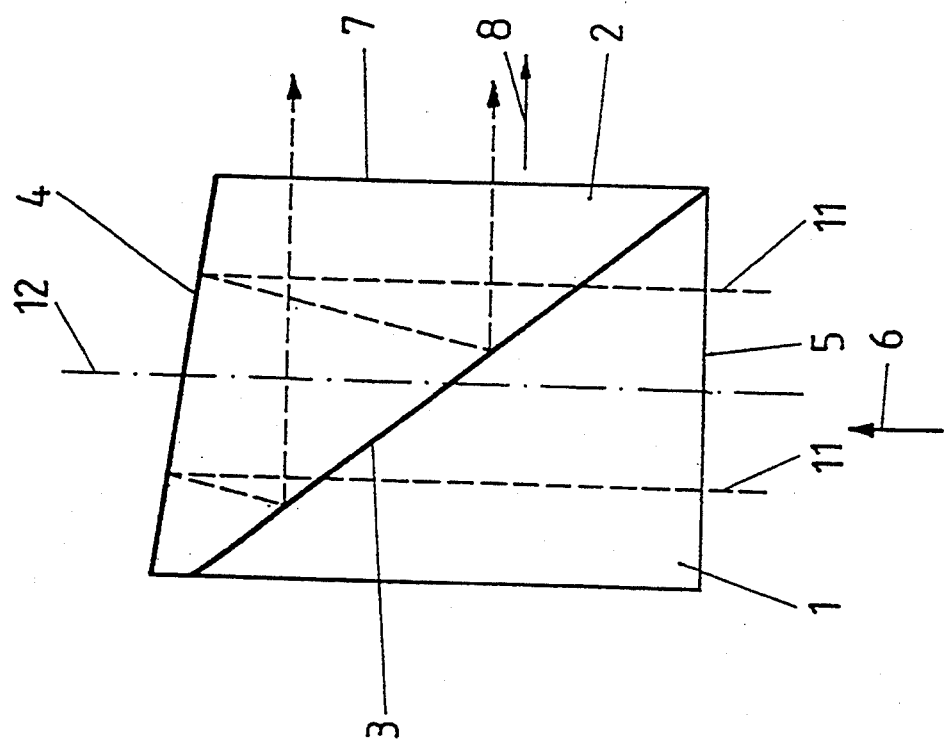
FIG. 3 is a version of the light beam deflection means according to FIG. 1 having a modified allocation of reflection face and mirror face with respect to the light entry direction.

FIG. 3 shows another exemplary embodiment of a light beam deflection means wherein the incident angle of the light ray 11 entering through the entry face 5 of the admission prism 1 is selected relative to the reflection surface 3 on the basis of the geometrical arrangement of the components such that the light beam 11 is first allowed to pass through the reflection surface 3 and is incident onto the mirror surface 4. The light beam 11 reflected by the mirror surface 4 is then again incident onto the reflection surface 3 with such an incident angle that the light beam 11 is now reflected and deflected to the exit face 7.

Figure 4:
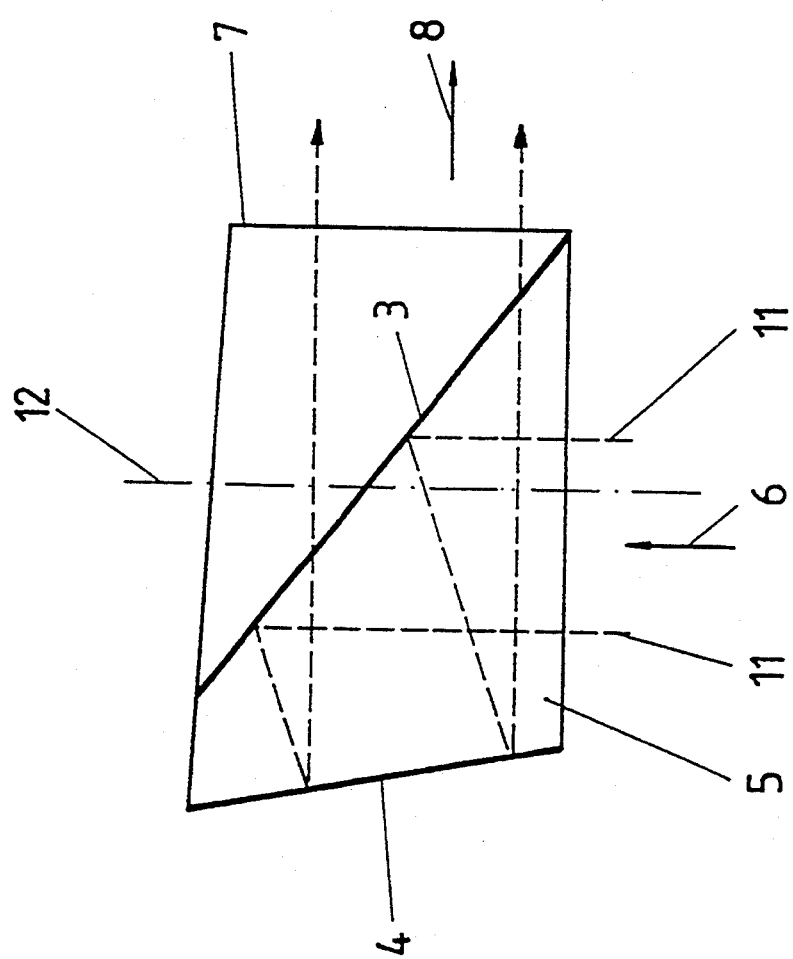
FIG. 4 is an alternative embodiment of the light beam deflection means of FIG. 3.

FIG. 4 shows an exemplary embodiment modified in comparison to FIG. 3 for a light beam deflection means wherein a reversal of the reflection properties is achieved on the basis of the modified geometrical arrangement of the components and on the basis of the modified design of the reflection surface 3 as a dielectric layer.

The mirror surface 4, for example, can be realized as a metallic vapor-deposition of the admission prism 1. However, it is also possible, for example, to provide a design as a dielectric layer or to realize a multi-layer format. The prisms 1, 2, 13 can be composed of different materials. A selection of materials expediently occurs dependent on the wavelength of the optical beam to be deflected. In addition to a design of glass, for example, it is possible to employ germanium prisms for infrared applications. The employment of transparent plastics is also fundamentally possible. The compensating prism 13 can also be realized with a non-transparent material. In particular, however, it is expedient to manufacture the compensating prism 13 of a material that exhibits essentially the same thermal expansion properties as the prisms 1, 2.

The angular dependency of the reflection properties 3 has been utilized in the exemplary embodiments of FIGS. 1 through 4. In the exemplary embodiments of FIGS. 5 and 6, the dependency of the reflection properties of the reflection surface 3 on the polarization direction of the light beam is exploited.

Figure 5:
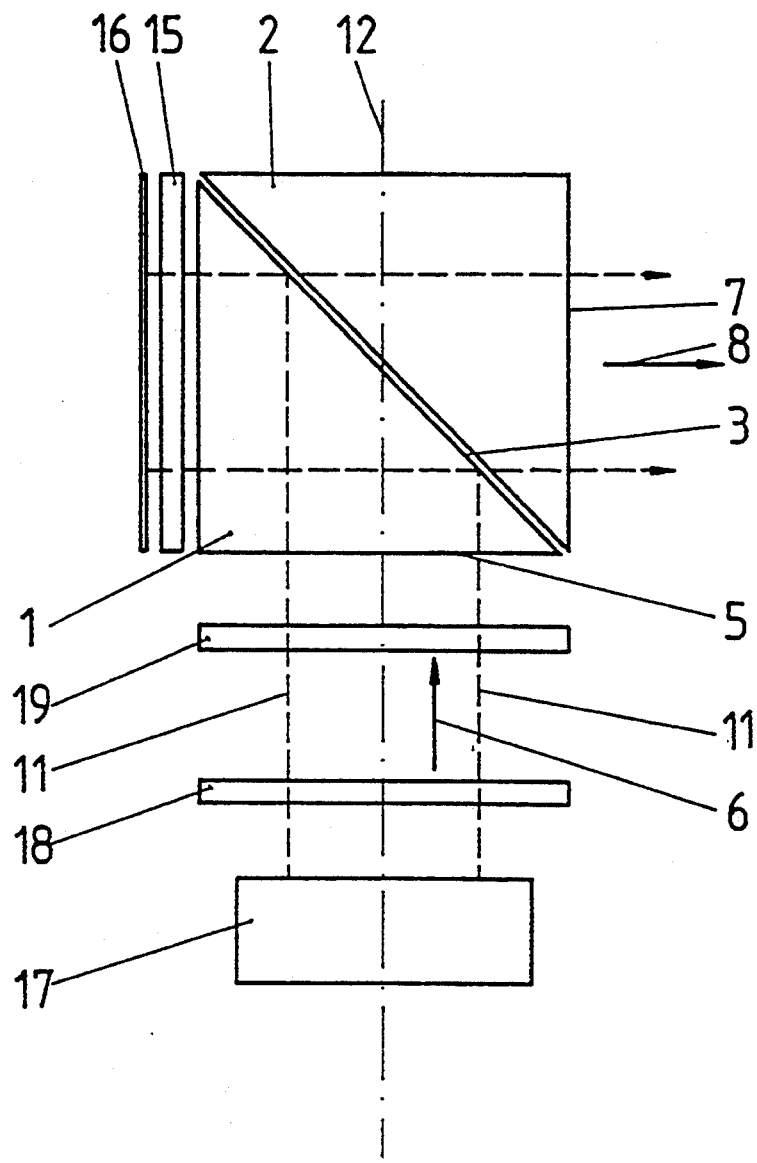
FIG. 5 is another exemplary embodiment of a light beam deflection means.

FIG. 5 shows an exemplary embodiment of a light beam deflection means that is likewise composed of an admission prism 1 having an entry face 5 and of an exit prism 2 having an exit face 7. A reflection surface 3 is again arranged in the region of the abutting boundary surfaces of the prisms 1, 2, this reflection surface 3 being designed as a dielectric multiple layer having reflection properties that are dependent on the polarization direction of the incident light beam. A polarization rotator 15 and a mirror 16 are arranged connected in series at that surface of the admission prism 1 proceeding perpendicularly relative to the entry face 5.

The light beam 11 incident through the entry face 5 of the admission prism 1 is linearly polarized in a defined polarization plane and is reflected at the reflection surface 3 in the direction toward the polarization rotator 15. The linearly polarized light beam 11 passes through the polarization rotator 15, is reflected at the mirror surface 16, and then passes through the polarization rotator 15 a second time, whereby the polarization direction of the linearly polarized light beam 11 is rotated by 90° relative to the original polarization direction. After the rotation of the polarization direction, the linearly polarized light beam 11 is now transmitted by the reflection surface 3 and departs the light beam deflection means through the exit face 7 of the exit prism 2.

Care must be exercised when rotating the light beam deflection means around the rotational axis 12 to see that the angle between the original polarization plane of the incident light beam 11 and the incident plane of the reflection surface 3 are preserved independently of the respective rotational angle of the prisms 1, 2, in that the polarization plane is co-rotated. A possible device for polarization rotation is shown in FIG. 5. A light source 17 generates a linearly polarized light beam 11. Fundamentally, any other light source that generates a non-polarized light beam can be employed in combination with a polarizer. The light beam 11 generated by the light source 17 initially passes through a polarization transformer 18 wherein the linear polarization is converted into a circular polarization. A further polarization transformer 19 that rotates in phase with the prisms 1, 2 converts the circular polarization of the light beam 11 back into a linear polarization having a polarization plane that rotates in phase with the prisms 1, 2.

The polarization rotator 15 and the polarization transformers 18, 19 can, for example, be designed λ/4 plates.

Figure 6:
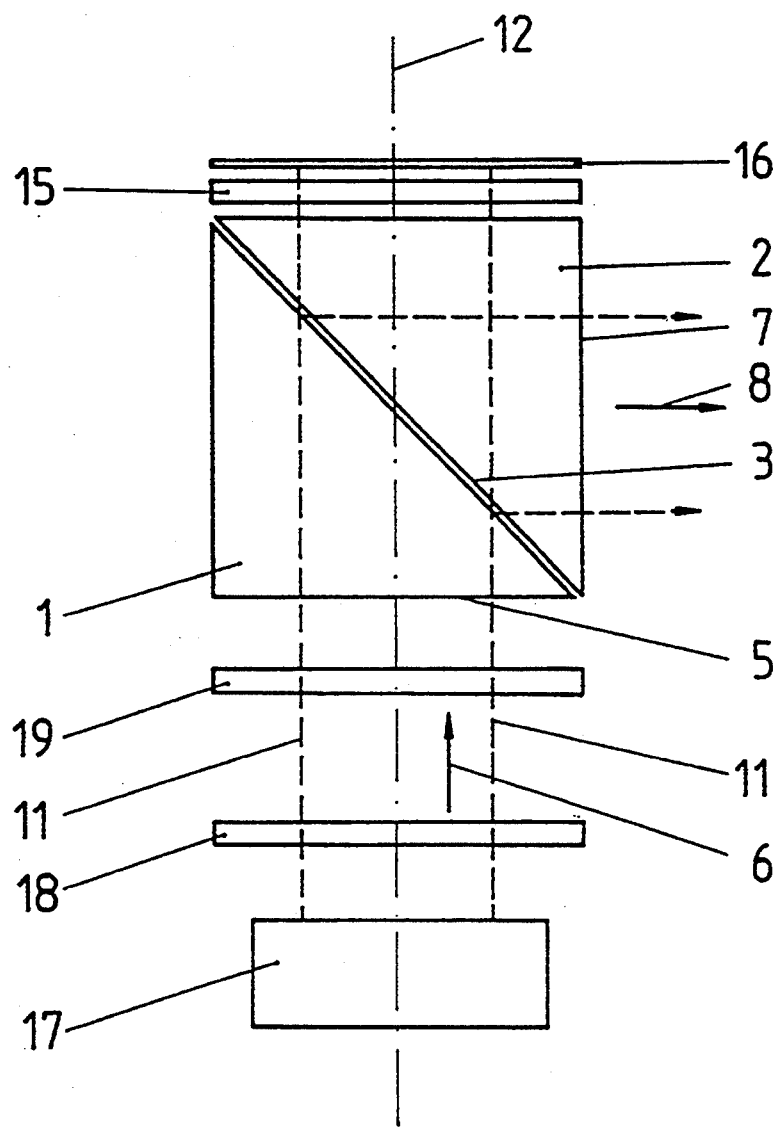
FIG. 6 is a further exemplary embodiment of a light beam deflection means.

FIG. 6 shows a modification of the exemplary embodiment shown in FIG. 5, wherein the polarization rotator 15 and the mirror 16 are arranged at that surface of the exit prism 2 which proceeds perpendicularly relative to the exit face 7. The reflection surface 3 is designed such that it initially transmits the linearly polarized light beam 11 entering through the entry face 5 and reflects the light beam rotated with the polarization rotator 15 and the mirror 16 by 90° in the polarization direction into the direction onto the exit face 7. Although various minor changes and modifications might be proposed by those skilled in the art, it will be understood that I wish to include within the scope of the patent warranted hereon all such changes and modifications as reasonably come within my contribution to the art.

I claim:

1. A device for deflecting an optical beam incident into the device, comprising:

at least first and second reflection surfaces permanently allocated to one another and which are rotationally seated with reference to a rotational axis, said rotational axis being parallel to said incident optical beam;

the first reflection surface having both transmission and reflection properties dependent on at least one of polarization direction or incident angle of the optical beam;

the first and second reflection surfaces being arranged relative to one another such that the optical beam incident into the device is incident onto said first reflection surface at a first angle and a beam reflected at said second reflection surface is incident onto said first reflection surface at a second angle, and wherein the incident optical beam is either reflected or transmitted by the first reflection surface and the reflected beam is either transmitted or reflected by the first reflection surface; and said first and second reflection surfaces being positioned relative to said incident optical beam which is parallel to the rotational axis such that an optical beam output from said device is perpendicular to said incident optical beam and rotational axis.

2. A device according to claim 1 wherein the first and second reflection surfaces are arranged relative to one another and with respect to said incident optical beam such that the incident optical beam is reflected at the first reflection surface, is reflected at the second reflection surface to form said reflected beam, and said reflected beam is then transmitted by said first reflection surface.

3. A device according to claim 1 wherein said first and second reflection surfaces are arranged relative to one another and with respect to said incident optical beam such that the incident optical beam is transmitted by said first reflection surface, is then reflected by said second reflection surface to form said reflected beam, and is then reflected by said first reflection surface.

4. A device according to claim 1 wherein said first reflection surface has a reflection property dependent upon polarization direction.

5. A device according to claim 1 wherein said first reflection surface has a reflection property dependent on incident angle of the optical beam.

6. A device according to claim 1 wherein said first reflection surface is applied at a boundary surface of a prism.

7. A device according to claim 1 wherein said first reflection surface is designed as an air gap.

8. A device according to claim 1 wherein said first reflection surface comprises two glued glass plates having different refractive indices.

9. A device according to claim 1 wherein said first reflection surface comprises two glued prisms having different refractive indices.

10. A device according to claim 1 wherein said device is comprised of an admission prism and an exit prism; and said first reflection surface is arranged at abutting boundary surfaces of the admission and exit prisms.

11. A device according to claim 1 wherein a compensating prism is provided which supplements the admission prism and the exit prism so as to form a symmetrical mass distribution with respect to the rotational axis.

12. A device according to claim 1 wherein said device has a symmetrical mass distribution with respect to said rotational axis.

13. A device according to claim 1 wherein an admission prism is provided having an entry face substantially perpendicular relative to an entry direction of said optical beam.

14. A device according to claim 1 wherein an exit prism is provided having an exit face arranged substantially perpendicular relative to an exit direction of said optical beam.

15. A device according to claim 1 wherein the first reflection surface has reflection properties dependent upon polarization direction of the light beam; and a means for converting the polarization direction in a region between said first reflection surface and said second reflection surface.

16. A device according to claim 15 wherein said means comprises a $\lambda/4$ plate.

17. A device according to claim 15 wherein a means is provided for conversion of a circularly polarized optical beam to a linearly polarized optical beam as provided at an entry face of an admission prism of the device.

18. A device according to claim 17 wherein said means comprises a $\lambda/4$ plate.

19. A device which rotates about a rotational axis for deflecting an incident optical beam which is parallel to the rotational axis so as to form an output beam perpendicular to the rotational axis, comprising:

a first reflection surface arranged at a first angle relative to the incident optical beam, and which reflects the incident optical beam which is parallel to the rotational axis;

a second reflection surface arranged relative to the first surface for reflecting the beam reflected by the first reflection surface back towards the first reflection surface as a reflected beam which is incident on the first reflection surface at a second angle different from the first angle and which is transmitted by the first reflection surface as said output beam, said second reflection surface being positioned so that the output beam is perpendicular to the incident beam and the rotational axis; and the first reflection surface having a reflection characteristic for said first angle and a transmission characteristic for said second angle.

20. A device which rotates about a rotational axis for deflecting an incident optical beam which is parallel to the rotational axis so as to form an output beam substantially perpendicular to the rotational axis, comprising:

a first reflection surface arranged at a first angle relative to the incident optical beam, and which transmits the incident optical beam which is parallel to the rotational axis;

a second reflection surface arranged relative to the first surface for reflecting the beam transmitted by the first reflection surface back towards the first reflection surface as a reflected beam which is incident on the first reflection surface at a second angle different from the first angle and which is reflected by the first reflection surface as said output beam, said first reflection surface having an angular position such that the output beam is perpendicular to the incident beam and the rotational axis; and the first reflection surface having a transmission characteristic for said first angle and a reflection characteristic for said second angle.

21. An apparatus for deflection of a light beam, comprising:
- a prism seated rotatably relative to a rotational axis, a mass distribution of the prism being substantially symmetrical relative to said rotational axis;
- said prism comprising an admission prism adjacent an exit prism;
- said admission prism having a light entry face running transversely to said rotational axis for an incident light ray which is parallel to the rotational axis, and said exit prism having a light exit face proceeding along a direction of said rotational axis for an output light ray which is perpendicular to the rotational axis and the incident light ray;
- said prism having a reflection surface arranged at boundary surfaces where said admission prism and exit prism are joined together;
- said prism having a mirror surface;
- said reflection surface having a reflection characteristic such that depending on one of the parameters angle of entry and polarization of a light ray projected on said reflection surface the light ray is either reflected or passed through;
- said reflection surface reflection characteristic, and a positioning of said mirror surface and said reflection surface being designed such that the light ray passing through said light entry face is reflected by said reflection surface, is reflected by said mirror surface, and then forms said output light ray which passes through said reflection surface; and
- said mirror surface and said reflection surface being positioned so that said output light ray is perpendicular to said rotational axis and to said incident light ray, 22. An apparatus for deflection of a light beam, comprising:
- a prism seated rotatably relative to a rotational axis, a mass distribution of the prism being substantially symmetrical relative to said rotational axis;
- said prism comprising an admission prism adjacent an exit prism;
- said admission prism having a light entry face running transversely to said rotational axis for an incident light ray and said exit prism having a light exit face proceeding substantially along a direction of said rotational axis for an output light ray, said incident light ray being parallel to said rotational axis and said output light ray being perpendicular to said incident light ray;
- said prism having a reflection surface arranged at boundary surfaces where said admission prism and exit prism are joined together;
- said prism having a mirror surface;
- said reflection surface having a reflection characteristic such that depending on one of the parameters angle of entry and polarization of a light ray projected on said reflection surface the light ray is either reflected or passed through;
- said mirror surface and said reflection surface being designed such that the light ray passing through said light entry face passes through said reflection surface, is reflected by said mirror surface, and then forms said output light ray which is reflected: and
- said mirror surface and said reflection surface being positioned so that said output light ray is perpendicular to said rotational axis and to said incident light ray.

* * * * *